Dec. 4, 1928.

Re. 17,149

F. J. COOK

ASSORTING MACHINE

Original Filed Aug. 4, 1925 2 Sheets-Sheet 1

Inventor:
Floyd J. Cook
by F. J. Geisler
Atty

Dec. 4, 1928.

Re. 17,149

F. J. COOK

ASSORTING MACHINE

Original Filed Aug. 4, 1925 2 Sheets-Sheet 2

Inventor:
Floyd J. Cook
by F. J. Geisler
Atty.

Reissued Dec. 4, 1928. Re. 17,149

UNITED STATES PATENT OFFICE.

FLOYD J. COOK, OF MEDFORD, OREGON.

ASSORTING MACHINE.

Original No. 1 646 951, dated October 25, 1927, Serial No. 48,073, filed August 4, 1925 Application for reissue filed September 19, 1928. Serial No. 306,986.

This invention relates to improvements in assorting machines, and more particularly to fruit and vegetable grading or sizing apparatus.

Heretofore, it has been customary to provide means for separating the fruit as it passes through the grading machine by varying the width of the slots through which the fruit is piloted. While such devices have been found satisfactory for grading round shaped fruits and vegetables, they are not efficient in assorting irregularly shaped fruits, such as pears or the like.

A primary object of the invention is to provide means for efficiently assorting and grading all kinds of fruits and vegetables, irrespective of their particular shape or configuration, and consists in attaching a flexible apron or the like to the adjacent sides of the conveyors so as to extend into the slots or runways of the machine, and thus cause the fruit or vegetable delivered thereto, to ride smoothly on the flexible apron until it comes to a slot or runway of the appropriate size where its journey ends, and it is dropped into a suitable receptacle, from which it may be conveniently removed.

A further object of the invention consists in dividing a grading machine into a sorting section and a sizing section, so arranged relative to each other as to permit the conveyors to ride over the surface of the machine, without danger of getting out of alignment or injuring the fruit, as it is conducted through the machine. Additionally, the sizing section below the conveyors is provided with grading bars adjustably connected to the frame to vary the width of the runways to selectively assort the fruit.

Referring to the drawing, wherein is shown a preferred embodiment of the invention:

Fig. 3 is a sectional view taken substantially along the line 3—3 of Fig. 2.

Figure 4:
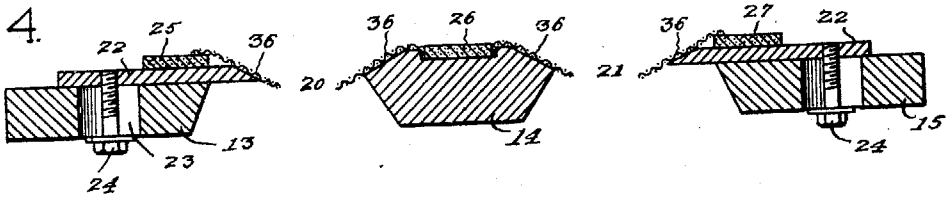
Fig. 4 is a sectional view taken substantially along the line 4—4 of Fig. 2.

Referring to the drawings in which like numerals indicate like parts in the several views, 10 denotes the frame of the machine, which is supported by the legs 11 and the brackets 12. Extending longitudinally of the frame and suitably connected thereto are a series of spaced members 13, 14 and 15, preferably three in number, which are arranged in such a manner as to form a sorting section 16 and a sizing section 17. The openings or slots 18 and 19 formed between the members 13, 14 and 15, respectively, of the sorting section 16, Fig. 3, are of uniform and fixed width, and less in size than the diameter of the smallest fruit or vegetable which it may be desired to grade. The width of the openings 20 and 21 in the sizing section 17, Fig. 4, may be selectively varied, as this section is formed with a series of independent grading bars 22, preferably mounted on the outer members 13 and 15 and adjustably connected at each end to these members by means of the slots 23 which receive the threaded bolts 24 to permit the plates 22 to be moved laterally relative to the member 14, and thus regulate the width of the openings 20 and 21, respectively.

A series of endless conveyors in the form of belts 25, 26 and 27 pass over the surface of the machine and engage the pulleys 28 and 29 keyed to the shafts 30 and 31, which shafts are journalled in the brackets 32, secured to the opposite ends of the members 16 and 17, respectively, by the bolts 33. The conveyors are preferably driven by a pulley 34 connected to one end of the shaft 30 and arranged to be driven by a belt 35 connected to a motor or the like, not shown.

The belts 25, 26 and 27 have connected to their marginal edges flexible aprons or the like 36, in any suitable manner, such as by the stitching 37. These aprons extend the entire length of each belt and are of sufficient width to overlie the adjacent sides of the members 13, 14 and 15 and project into the slots or runways 18 and 19. In order that the belts may pass over the frame smoothly and evenly, without danger of getting out of alignment, the members 13, 14 and 15 at the delivery end of the frame, and the central member 14 throughout its length, are provided with recesses 38 in their upper surface, which receive the belts and act as guides for them when the machine is in operation.

Figure 2:
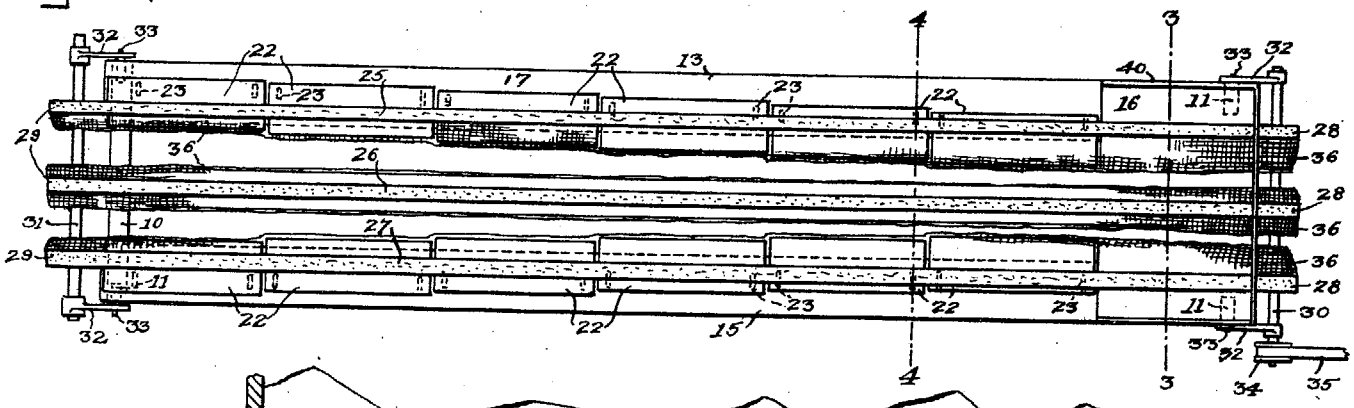
Fig. 2 is a plan view of Fig. 1.
Figure 7:
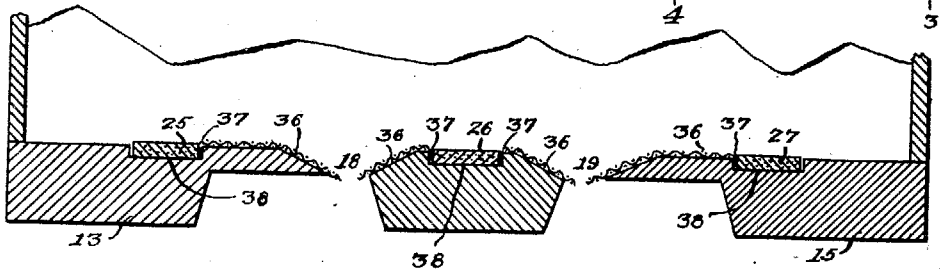

One of the main features of my invention consists in providing means for effecting a considerable number of gradings of fruit or vegetable within the limits imposed by the length of the machine. This feature is important since it increases materially, and desirably, the capacity of my invention; in other words, it enables a single machine to effect the same number of gradings as previously required several machines to do. The said feature of my machine is attained by making one of the grading elements thereof to consist of a number of relatively short grading bars, 22 (see the patent drawings Figs. 2 and 4) arranged end to end lengthwise of the machine in steps relatively to a cooperating grading member presented in the frame member 14 of the machine, and consisting of a continuous bar extending lengthwise of the machine; the said short grading bars being mounted for independent lateral adjustment on the frame members 13 and 15 extending in parallel relation with said continuous grading element 14. The openings thus formed between the continuous grading element 14 and the said short grading bars 22 respectively, serve as runways, the width of which increases in steps progressively with, and according to, the adjustment of said short grading bars; and thus as many gradings of the fruit or vegetable may be made as there are grading bars 22 provided in the length of my machine.

It will be noted that in the sizing section 17 of the frame, the conveyor belts 25 and 27 pass over the top of the grading bars 22 so as to permit the latter to be adjusted relative to the member 14 to vary the width of the openings 20 and 21, as may be desired, without interfering with the course of the movement of said conveyor belts 25 and 27. Furthermore, the openings 18, 19, 20 and 21 formed between the members 13, 14 and 15 act as runways for the flexible aprons 36 during the grading operation.

The fruit or vegetable 39 to be assorted is emptied on an inclined hopper 40 positioned at the delivery end of the frame 10, and is manually conducted to the slots 18 and 19 formed in the sorting section of the frame, where it is piloted by the flexible aprons to the slots 20 and 21 and the grading bars 22.

Figure 1:
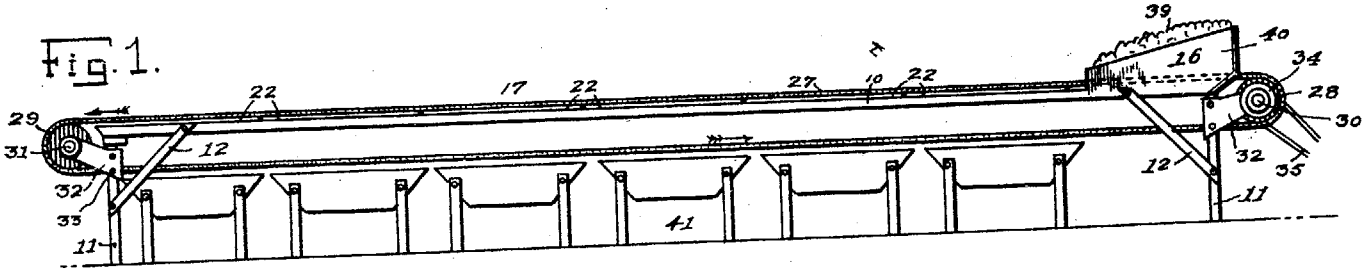
Fig. 1 is a side elevation of the assorting machine.

The operation of the device is as follows:

As the belts 25, 26 and 27 of the conveyor move at a uniform rate of speed in the direction of the arrow, as shown in Fig. 1, the flexible aprons 36 connected to the belts receive the fruit or vegetable 39 from the hopper 40 and conduct the same past the openings 18 and 19 to the runways 20 and 21 of the sizing or grading section 17. The operator, preferably stands beside the hopper 40 so as to assort or remove any of the fruit which he considers should not be graded.

The grading bars 22 have been previously adjusted so as to permit the fruit or vegetable being graded to fall between the openings 20 and 21 when such fruit is of substantially the same diameter as these runways. The fruit after passing through the openings 20 and 21, falls into suitable containers or bins 41, positioned beneath the frame 10, Fig. 1, from which it may be conveniently removed.

Assuming my machine to be made for double capacity as it were, as shown in the drawings; that is to say, for grading two lines of fruit or vegetables simultaneously, as provided for by the central grading member 14 in cooperation with the frame members 13 and 15, on which my said short grading bars 22 are mounted, it will be seen that the width of the openings 20 and 21 of the runways may be so regulated by the proper adjustment of said grading bars 22, that the same sized fruit, or vegetable, can be deposited in two or more consecutive receptacles located below the runways; since the slight difference in width between the opening 20 and the opening 21, inadvertently made in the adjustment of corresponding grading bars mounted on the frame members 13 and 15, would be negligible in practical operation.

Furthermore, the flexible apron 36 causes the fruit or vegetable being assorted to ride along smoothly until it reaches openings in the slots 20 and 21 wide enough to permit it to pass therethrough. It will be seen that by reason of this particular construction, irregularly shaped fruits or vegetables, such as the long-nosed Bosc, Bartlett or Comice pears, may be accurately separated and graded.

While I have disclosed the invention adapted for use in grading fruit and vegetables, it is to be understood that the device is equally applicable for separating and sorting other articles, and that such changes as fall within the purview of one skilled in the art may be made without departing from the invention and scope of the appended claims.

I claim:

1. A grading machine of the class described comprising a frame having longitudinally extending spaced members, the slots between the members forming runways for grading the articles passing through the machine, said frame being divided into a sorting section and a sizing section, guide grooves formed in the upper surface of the members in the sorting section, a series of longitudinally spaced grading bars connected to said sizing section, means for selectively and independently adjusting said grading bars to vary the width of the runways, endless conveyors extending through the grooves in the sorting section and above said grading bars, whereby the bars may be moved laterally without affecting the movement of the conveyors, flexible aprons connected to the sides of said conveyors and projecting into the runways, and means for driving said conveyors.

2. In a grading machine of the class described, the combination of a frame comprising spaced longitudinal members, a series of independent relatively short grading bars, arranged end to end, longitudinally, carried by one of said members and adjustable, independently, relatively to the other of said members to form therewith a runway space progressively enlarged in steps and means for selectively and independently adjusting said grading bars laterally on the said frame member, to vary the width of the said runway relatively to each of the said bars, and an endless conveyor extending at all times into the runway space.

3. In a grading machine of the class described, the combination of a frame comprising spaced longitudinal members, a series of independent relatively short grading bars, arranged end to end, longitudinally, carried by one of said members and adjustable, independently, relatively to the other of said members to form therewith a runway space progressively enlarged in steps, means for selectively and independently adjusting said grading bars laterally on the said frame member, to vary the width of the said runway relatively to each of the said bars and endless conveyors extending at all times into said runway, one thereof extending over said grading bars, whereby said grading bars may be moved laterally without affecting the longitudinal course of the conveyor.

4. In a grading machine of the class described, the combination of a frame comprising spaced longitudinal members, a series of independent relatively short grading bars, arranged end to end, longitudinally, carried by one of said members and adjustable, independently, relatively to the other of said members to form therewith a runway space progressively enlarged in steps and means connected to each end of each grading bar for selectively and independently adjusting the same laterally on the said frame member, to vary the width of the said runway relatively to each of the said bars, and conveyors extending into the runway space.

5. In a grading machine of the class described, the combination of a frame comprising spaced longitudinal members, a series of independent relatively short grading bars, arranged end to end, longitudinally, carried by one of said members and adjustable, independently, relatively to the other of said members to form therewith a runway space progressively enlarged in steps, means for selectively and independently adjusting said grading bars laterally on the said frame member, to vary the width of the said runway relatively to each of the said bars and endless conveyors lying substantially in the same horizontal plane and extending into the runway, one thereof extending over said grading bars, whereby said grading bars may be moved laterally without affecting the longitudinal course of the conveyor.

6. In a grading machine of the class described, the combination of a frame comprising spaced longitudinal members, a series of independent relatively short grading bars, arranged end to end, longitudinally, carried by one of said members and adjustable, independently, relatively to the other of said members to form therewith a runway space progressively enlarged in steps, means for selectively and independently adjusting said grading bars laterally on the said frame member, to vary the width of the said runway relatively to each of the said bars, endless conveyors, and flexible aprons carried by said conveyors and overlying and projecting into said runway, one of said conveyors extending over said grading bars, whereby said grading bars may be moved laterally without affecting the longitudinal course of the conveyor.

FLOYD J. COOK.